(12) United States Patent
Huang et al.

(10) Patent No.: US 6,757,328 B1
(45) Date of Patent: Jun. 29, 2004

(54) MOTION INFORMATION EXTRACTION SYSTEM

(75) Inventors: Qingming Huang, Singapore (SG); Qi Tian, Singapore (SG); Sheng Lo, Singapore (SG)

(73) Assignee: Kent Ridge Digital Labs., Singapore (SG)

( * ) Notice: Subject to any disclaimer, the term of this patent is extended or adjusted under 35 U.S.C. 154(b) by 0 days.

(21) Appl. No.: 09/464,533

(22) Filed: Dec. 15, 1999

(30) Foreign Application Priority Data

May 28, 1999 (SG) ............................................. 9902927

(51) Int. Cl.⁷ ................................................. H04B 1/66
(52) U.S. Cl. ................................................. 375/240.1
(58) Field of Search .......................... 348/415.1, 416.1, 348/401.1, 420.1, 459, 443, 444, 456; 382/307, 104, 141, 305; 375/240.1, 240.02

(56) References Cited

U.S. PATENT DOCUMENTS

| | | | |
|---|---|---|---|
| 5,062,056 A | * 10/1991 | Lo et al. ...................... 235/411 |
| 5,193,001 A | 3/1993 | Kerdranvrat ................ 358/105 |
| 5,214,504 A | * 5/1993 | Toriu et al. ............ 375/240.02 |
| 5,467,402 A | * 11/1995 | Okuyama et al. ........... 382/104 |
| 5,479,218 A | 12/1995 | Etoh ........................... 348/699 |
| 5,642,166 A | 6/1997 | Shin et al. .................. 348/416 |
| 5,706,362 A | 1/1998 | Yabe .......................... 382/103 |
| 5,717,414 A | 2/1998 | Bergsneider et al. .......... 348/8 |
| 5,742,710 A | 4/1998 | Hsu et al. .................... 382/236 |
| 5,745,126 A | * 4/1998 | Jain et al. .................... 382/154 |
| 5,793,985 A | 8/1998 | Natarajan et al. ....... 395/200.77 |
| 5,808,685 A | 9/1998 | Jung ........................... 348/416 |
| 5,818,969 A | 10/1998 | Astle ........................... 382/236 |
| 5,859,673 A | 1/1999 | Kobayashi et al. .......... 348/699 |
| 5,864,372 A | 1/1999 | Chen et al. .................. 348/699 |
| 5,872,604 A | 2/1999 | Ogura ......................... 248/699 |
| 6,057,847 A | * 5/2000 | Jenkins ....................... 345/422 |
| 6,208,760 B1 | * 3/2001 | De Haan et al. ............ 382/236 |
| 6,364,845 B1 | * 4/2002 | Duffy et al. ................. 600/558 |

FOREIGN PATENT DOCUMENTS

| | | |
|---|---|---|
| EP | 0427537 | 5/1991 |
| EP | 0903946 | 3/1999 |

\* cited by examiner

*Primary Examiner*—Chris Kelley
*Assistant Examiner*—Behrooz Senfi
(74) *Attorney, Agent, or Firm*—Ladas & Parry

(57) ABSTRACT

A method, an apparatus, and a computer program product for extracting motion information (110) from a video sequence (130, 600) containing interframe motion vectors (120) are disclosed. In particular, motion information (110) is automatically extracted (610) from an encoded traffic video stream (600) to detect speed, density and flow. The motion information (110) extracted is under fixed camera settings and in a well-defined environment. The motion vectors (120) are first separated (610) from the compressed streams (130) during decoding and filtered (620) to eliminate incorrect and noisy motion vectors based on the well-defined environmental knowledge. By applying a projective transform (630) to the filtered motion vectors, speed, density, and flow can be detected (640, 650, 660). In this manner, a traffic monitoring system is implemented.

39 Claims, 6 Drawing Sheets

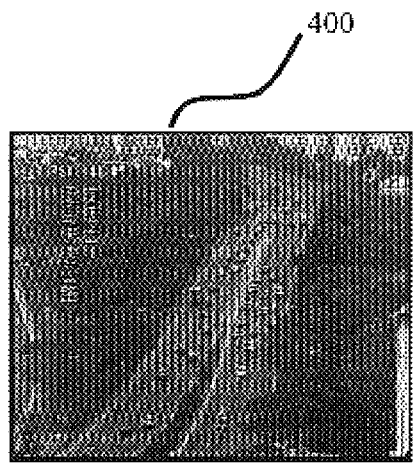 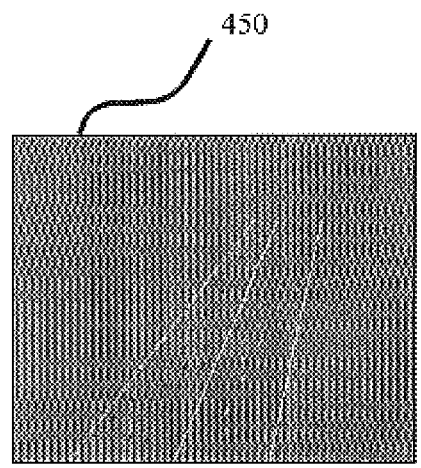
FIG. 4A  FIG. 4B
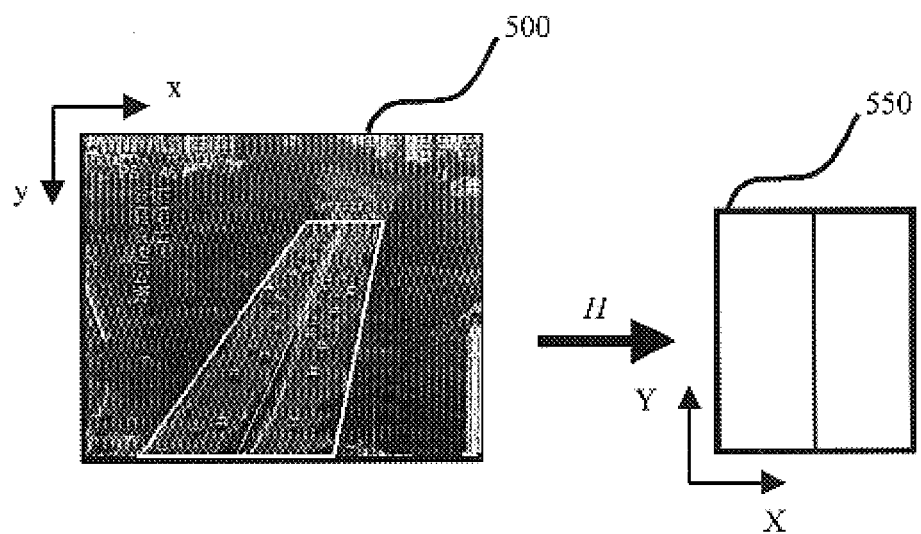
FIG. 5

MOTION INFORMATION EXTRACTION SYSTEM

FIELD OF THE INVENTION

The present invention relates to the field of video processing and, in particular, to systems for extracting motion information from an encoded video sequence, including traffic monitoring applications.

BACKGROUND

Motion information can be of great importance in a number of applications, including traffic monitoring, tracking people, security and surveillance. For example, with the increasing number of vehicles on the road, many cities now face significant problems with traffic congestion. Tackling the problem has become a high priority task for many countries. This is an example of an application for motion information extraction. The application of image processing and video sensing in motion information extraction has evolved rapidly in recent years, from the stage of feasibility studies to that of operational uses. In such systems, monitoring cameras and sky cameras have been placed along roadways to enable relevant authorities and the general publics to obtain motion information about the flow of traffic. In this regard, accurate and up-to-date motion information is a key requirement among all these users.

With the large amount of data, some kind of intelligent system is required to sift through the information to present the user with concise, useful information. On the other hand, broadband communication and video transmission has been gaining ground very quickly in recent years. It can therefore be anticipated that such a communication channel will be a key component through which motion information can be disseminated. As such, any tools that are able to extract useful information from such channel will have a potential large marketplace.

Compared with other motion detection approaches such as the inductive loop or virtual loop methods, motion detection from videos offers a flexible alternative and is therefore becoming widely used. Video cameras for motion detection can be easily added at any place and any time at a comparably low cost. The cameras can be used to provide data of long viewing stretches. However, in video motion detection, the main problems encountered are related to the development of robust processing tools and to the consequent high computational complexity. Real-time processing of video sequences represents a fundamental issue so that computationally efficient motion extraction applications, such as traffic monitoring and surveillance system, can be put into use. Visual information, acquired by cameras and digitized at known frame rates by dedicated boards, is usually characterized by high dimensionality, spatial and temporal complexity, as well as noise sensitivity.

Currently, commonly used approaches to video motion detection include optical flow and object tracking. The optical flow method attempts to study object motion by providing an estimation of the optical flow field in terms of spatio-temporal image intensity gradients, which are calculated at every pixel of the image subject to some form of global smoothness constraints. Therefore, the optical flow method is computationally intensive, which makes on-line and real-time traffic monitoring from video sequences difficult. In addition, this method causes inaccurate motion estimation at the occlusion boundaries.

The object tracking method attempts to trace the movement of the objects from frame to frame in a video sequence. Although single or few objects can be tracked adequately using existing image processing techniques, multiple objects tracking in complex environment remains an unsolved issue. For example, there may be many vehicles on the roads under high-density traffic situations. Thus, for a vehicle in a frame, finding its corresponding one in the reference frame can be difficult, and the computational cost can be extremely high. In addition, the segmentation of multiple overlapping moving objects in low-resolution images remains an ill-posed problem.

A number of systems for block motion estimation and motion vector calculation have been proposed.

U.S. Pat. No. 5,864,372 describes an apparatus for implementing block matching for motion estimation in video image processing. The apparatus receives pixel data of an original image block and pixel data of a compared image block selected from a number of compared image blocks during video image processing. The selected image blocks are compared to determine a movement vector. The apparatus has a multi-stage pipelined tree-architecture that includes four stages. The first computational stage produces corresponding pairs of difference data and sign data. A second compression stage in the process pipeline includes a compression array that receives all the difference data and sign data, which are added together to produce compressed summation data and compressed sign data. The third summation stage in the pipeline receives compressed summation and sign data and produces a mean absolute error for the original and compared image block pixels. A last minimization stage receives the mean absolute error for each of the compared image blocks and determines a minimum mean absolute error from among them. The compression array includes of a number of full and half adders arranged in a multi-level configuration in which none of the adder operand inputs and the carry-in inputs is left unconnected. However, it is just an apparatus of block motion estimation and does not extract any motion information.

U.S. Pat. No. 5,872,604 describes a method of detecting motion vectors that detects motion based upon calculation of picture data of a reference block and upon picture data in a search block. The search block is located within a search area and then the search area is variably set. An apparatus for detecting motion vectors includes a motion detection circuit for detection motion based upon calculation of picture data of a reference block and upon picture data in a search block, located within a search area, and a circuit for variably setting the search area. However, only a method and apparatus for block motion vector calculation are described, and it does not extract any motion information.

U.S. Pat. No. 5,793,985 describes a method of block-based motion estimation used in video compression. The compression process derives change data for a new frame of data (with respect to a reference frame) by first dividing the frame structure into data tiles (or data blocks) of identical size. Each tile in the new frame is compared to a localized window (about the tile's expected position) in the reference frame to search for a best fit, and thereby provide motion data for the particular tile. Once the best fit is determined, motion-compensated difference data is determined and stored with the motion data for each tile to complete the process. To achieve computation efficiency, each tile under analysis is preferably converted to single-bit value data and searching and comparisons are performed based on such transformed single-bit data. The single bit data is computed by convolving the original image data with a low-pass filter to obtain a threshold matrix. The original image data is then compared with the threshold matrix and converted to single-bit values in dependence on whether the values of the data exceed counterparts in the threshold matrix. Comparison is performed using an exclusive—or function and bit—summation of results. However, the patent only describes a block motion vector generating method on low-bit images, and not a method of motion information extraction.

U.S. Pat. No. 5,742,710 describes a block-matching method for generating motion vectors. The method performs block matching on successively higher resolution images by refining motion vectors determined in a lower resolution image. At respective higher resolution images, search areas of limited search range are defined via a motion vector associated with corresponding image areas in the immediately lower resolution search. For at least one level of image resolution, the search blocks are overlapped to provide a plurality of search areas of limited search range for performing block matching searches for each block in the next higher resolution level. Again, this method presents a way of block motion vector calculation, and does not perform any motion information detection.

All of the foregoing systems have placed a heavy emphasis on the approaches of obtaining block motion vectors, but have not exploited the advantages of using motion vectors directly from encoded video sequences for motion information extraction. Thus, a need clearly exists for such a system with reduced complexity and computational cost for applications such as traffic monitoring.

SUMMARY

In accordance with a first aspect of the invention, there is disclosed a method of extracting motion information from an encoded video stream containing interframe motion vectors under fixed camera settings and a well defined environment. The method includes the steps of: separating motion vectors obtained from the encoded video stream; filtering the motion vectors based on predetermined environmental knowledge; and determining predetermined parameters based on the filtered motion vectors. The determining step includes the step of calculating the motion information using motion vector analysis on the filtered motion vectors.

Preferably, the filtering step includes the sub-step of eliminating any motion vectors that: do not coincide with a road direction, intersect with other motion vectors, cross a road border, or do not have appropriate amplitude or size. Still further, the predetermined parameters include speed, density and flow and may be provided at regular time intervals.

Preferably, the encoded video stream is obtained from a sky camera. The video stream is a motion vector presentation of compressed video. More preferably, the compressed video has a format selected from the group of formats consisting of MPEG and H.26x.

The method may include one or more of the steps of detecting speed based on an amplitude calculation of the filtered motion vectors, detecting density based on occupancy computation of microblocks with nonzero motion vectors, and estimating flow based on a combination of speed and density detection. The speed is detected based on an amplitude calculation of the filtered motion vectors and the density is detected by an occupancy computation of microblocks with nonzero motion vectors.

Preferably, the interframe motion vectors are generated using electronic encoding hardware.

Preferably, the filtering step includes at least one of the sub-steps of: eliminating any motion vectors that do not coincide with a predetermined direction; eliminating any motion vectors that intersect with other motion vectors; eliminating any motion vectors that cross a predetermined border; and eliminating any motion vectors that do not have an appropriate amplitude or size.

More preferably, the method involves monitoring traffic, where the encoded video stream is an encoded traffic video stream obtained from a sky camera in a well defined traffic environment using predetermined traffic knowledge and involving the determination of predetermined traffic parameters.

In accordance with a second aspect of the invention, there is disclosed an apparatus for extracting motion information from an encoded video stream containing interframe motion vectors under fixed camera settings and a well defined environment. The apparatus includes: a device for separating motion vectors obtained from the encoded video stream; a device for filtering the motion vectors based on predetermined environmental knowledge; and a device for determining predetermined parameters based on the filtered motion vectors.

In accordance with a third aspect of the invention, there is disclosed a computer program product having a computer readable medium having a computer program recorded therein for extracting motion information from an encoded video stream containing interframe motion vectors under fixed camera settings and a well defined environment. The computer program product includes: a module for separating motion vectors obtained from the encoded video stream; a module for filtering the motion vectors based on predetermined environmental knowledge; and a module for determining predetermined parameters based on the filtered motion vectors.

BRIEF DESCRIPTION OF THE DRAWINGS

A small number of embodiments of the invention are described hereinafter with reference to the drawings, in which:

FIGS. 4A and 4B depict filtered motion vectors, with and without the still image of FIG. 2A depicted;

FIG. 5 illustrates a projective transform H between the image coordinate (x, y) and world coordinate (X, Y) applied to the still image of FIG. 2A;

DETAILED DESCRIPTION

Figure 1:
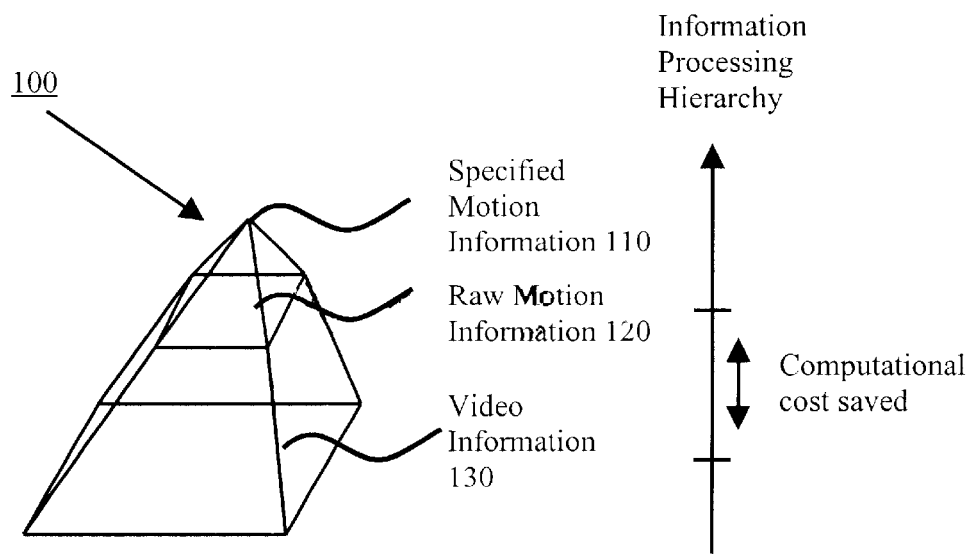
FIG. 1 is a diagram depicting a hierarchy of motion information extraction in accordance with the embodiments of the invention.

A method, an apparatus, and a computer program product for extracting motion information from a video sequence containing interframe motion vectors are described. More particularly, a method, an apparatus, and a computer program product for monitoring traffic by extracting motion information from an encoded traffic video stream containing interframe motion vectors are described. In the following description, numerous details are set forth including compressed video formats, transforms, and the like, for example. It will be apparent to one skilled in the art, however, that the present invention may be practised without these specific details. In other instances, well-known features are not described in detail so as not to obscure the present invention.

In the following description, components of the system can be implemented as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

The embodiments of the invention provide a motion information extraction technique that automatically obtains real-time speed, density and flow detection. This is preferably done using a fixed camera setting and a well-defined environment, such as a highway under wide viewing coverage (up to several hundred meters long) from a sky camera or the like. A well defined environment is an environment, involving a camera at a fixed or predefined location, where moving objects can move in predefined areas and directions. In particular, the embodiments provide a motion vector processing scheme that involves: motion vector extraction from MPEG video or H.26x (H.261/H.263/H.263+) video stream; motion vector filtering based on environmental knowledge; and motion information detection based on motion vector: analysis. Further, to simplify the problem solution, the labeling of a predefined area mask, which indicates the interesting area in which the motion information is to belextracted from, may be implemented to reduce the computational cost of motion vector processing. Before the actual operation of motion information extraction starts, this labeling need only be performed once for each camera setting. While the embodiments are described with reference to the MPEG and H.26x video formats, those skilled in the art will readily appreciate in view of this disclosure that other video formats having interframe motion vectors can be practiced.

In existing MPEG and H.26x video formats, block-matching techniques obtain motion vectors representing the movement of objects at the microblock level (16×16 pixels). A microblock of the current frame is moved within a search window in the reference frame and compared to all possible microblocks of the window to find a microblock that is most similar. The difference in position of the two matching microblocks defines the motion vector. Usually, due to the large number of frames in a video sequence, the cost of motion vector computation can be fairly high, up to tens of giga-operations per second (GOPS) even for Source Input Format (SIF) resolution video (352×288 pixels). This makes real-time calculation of motion vectors difficult if done only by software. However, real-time processing can be achieved using a hardware implementation of a video encoding card. According to the nature of the MPEG and H.26x standards, only interframes (i.e., Predicted or P frames and Bi-directional or B frames) have motion vectors. There are no B frames in the H.261/H.263 standards, and therefore only motion vectors of P frames are used here for motion information detection.

Figure 7:
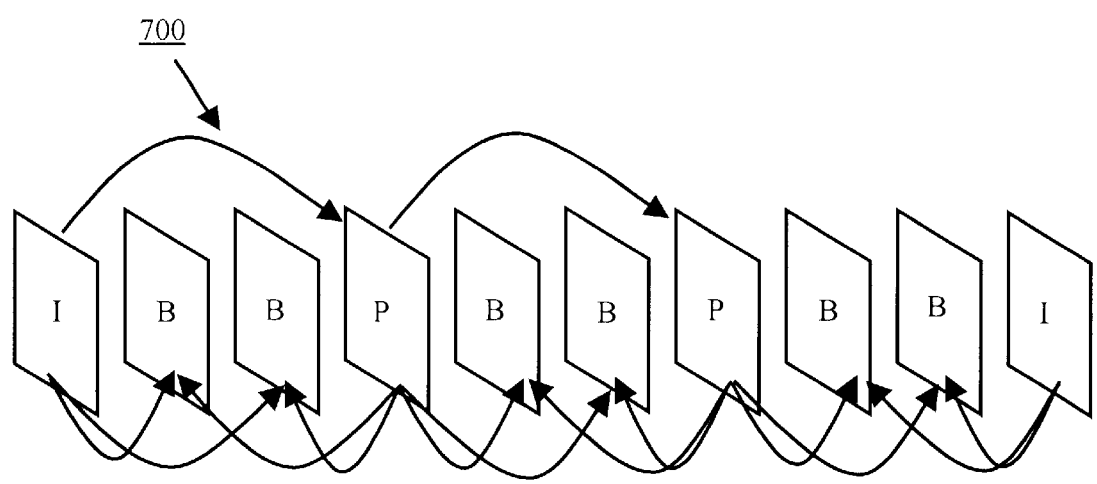
FIG. 7 is a block diagram illustrating the interframe structure of a video sequence.

FIG. 7 is an illustration of the interframe structure of the MPEG or H.26x video standard. In MPEG, there are three types of frames: I-, P- and B-frames 700. An I-frame is intra-coded and has no motion vectors. As depicted, a P-frame is coded from either a preceding I- or P-frame. A B-frame is coded by bidirectional interpolation between one of an I- or P-frame that precedes the B-frame and another I- or P-frame that follows the B-frame.

In the H.261 and H.263 standards, there are no B frames; alternatively, the number of B frames between I-P, P-P or P-I frames are considered to be zero. Depending on the complexity of the video encoder used, the number of I, P and B frames in a compressed video may be different. That is, the number of P-frames between two consecutive I-frames, as well as the number of B-frames between consecutive I-P, P-P or P-I frames, may not be fixed for different interframe structures. Different motion vectors result for different frame rates.

Due to the complexity of motion vector calculation in the encoding process, the raw motion vectors extracted from an MPEG or H.26x video stream may contain incorrect motion vectors and noise. The incorrect motion vectors and noise result in false detection of motion information. Therefore, the embodiments of the invention utilize motion vector filtering to eliminate the incorrect motion vectors and noise. Preferably, the motion vector filtering is based on specific environmental knowledge. For example, in a system for extracting highway traffic information, the relevant environmental knowledge can include that: the motion vectors do not coincide with the road direction; the motion vectors do not intersect with each other; the motion vectors do not cross road borders; and the motion vectors are of inappropriate amplitude or size.

Using the filtered motion vectors (preferably, after transforming the filtered vectors between image coordinates and world coordinates), motion parameters including speed, density, and flow can be detected. "Speed" refers to the average velocity of a stream of moving objects in a predetermined or fixed direction and can be calculated as a factor of a mean amplitude of motion vectors in that direction. "Density" refers to a percentage of moving objects passing over a certain area during an observation time interval and can be computed as an occupancy of microblocks with nonzero motion vectors on the area over that time interval. "Flow" refers to a movement condition of moving objects and can be inferred as a combination of "speed" and "density".

In the method of motion information extraction according to the embodiments of the invention, the process of locating, segmenting and tracking individual targets is advantageously bypassed altogether. The method embodies the idea of starting at a higher level in the hierarchy of motion information processing. FIG. 1 depicts this information processing hierarchy 100 for motion information extraction. The hierarchy has three levels: a bottom level 130 of original video information, a middle level 120 of raw motion information, and a top level 110 of specified motion information.

Traditional methods start from the bottom level to detect raw motion information 120 from the original video 130. In contrast, the embodiments of the invention start from the middle level 120 by applying the motion vectors obtained directly from the MPEG or H.26x technique to derive the specified motion information 110. The middle level 120 contains motion vectors as a kind of raw motion information belonging to this level. The top level is the specified motion information 110, such as the traffic or people queue information, extracted after the analysis of the raw motion information. This represents a significant savings in computational costs in comparison to traditional approaches.

More preferably, the embodiments of the invention can implement a system of highway traffic information extraction based on MPEG video. The highway traffic monitoring method involves encoding sky-camera traffic video clips into MPEG streams, separating and filtering MPEG motion vectors when decoding the MPEG streams, and determining highway traffic parameters, including speed, density and flow, at regular time intervals. Further aspects of the embodiments are described hereinafter.

Flow Diagram of First Embodiment

Figure 6:
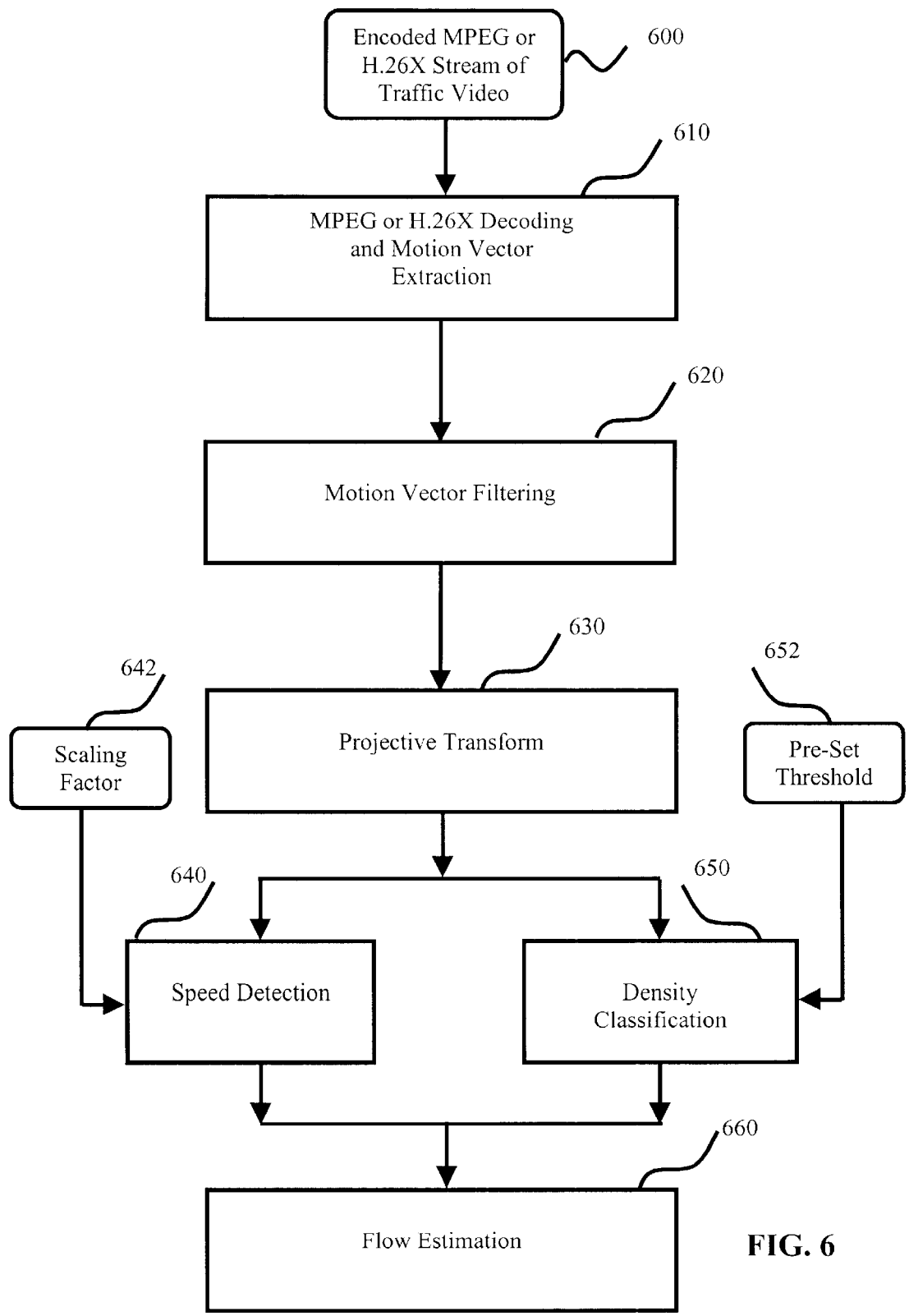
FIG. 6 is a flow diagram of a method of extracting motion information including speed, density and flow in accordance with a first embodiment of the invention.

FIG. 6 is a flow diagram illustrating the method of extracting motion information from a video sequence 600 containing interframe motion vectors and in particular for monitoring traffic by extracting motion information from an encoded traffic video stream. An encoded MPEG or H.26x stream of traffic video 600 is provided as input. In step 610, MPEG or H.26x decoding is applied to the traffic video stream 600, and motion vectors are extracted from the decoded stream. In step 620, the motion vectors are filtered. Incorrect and/or noisy motion vectors are eliminated. Step 620 is described hereinafter in greater detail with reference to FIG. 8. In step 630, a projective transform is applied to the filtered motion vectors.

In step 640, a scaling factor 642 and the filtered motion vectors are received as input to detect the "speed" of a stream of moving objects in a predetermined direction. The speed of moving objects is calculated by analyzing the mean amplitude value of relevant filtered motion vectors. Using off-line labeling to obtain the predefined area mask, the scaling factor 642 between a pixel distance in an image (e.g. a still image) and a real distance in the world can be established. For example, if the length of an object is L and the object occupies n pixels in the image, the scaling factor f is calculated as f=L/n. If the mean amplitude value of the filtered motion vectors has $d_f$ pixels, the frame rate of the video is $n_r$ frames/second, and the number of interframes between I-P, P-P or P-I frames is $n_B$, then the average velocity v is:

$$v = \frac{f n_r d_f}{n_B + 1}$$

In the existing MPEG standard, a motion vector reflects the movement of a microblock.

Preferably, step 650 is performed in parallel with step 640, however, it will be appreciated by those skilled in the art in view of this disclosure that this need not be the case. For example, steps 640 and 650 can be implemented sequentially instead. In step 650, a pre-set threshold 652 and the filtered motion vectors are input to carry out density classification or determination in respect of moving objects passing over a certain area during an observation time interval. The density d can be estimated as follows:

$$d = \frac{N_{MV}}{N_{RD}}$$

where $N_{RD}$ is the number of microblocks in the detecting area and $N_{MV}$ is the number of the filtered motion vectors.

From steps 640 and 650, processing preferably continues at step 660. In step 660, the flow of moving objects is estimated using the "speed" and "density" determined in steps 640 and 650, respectively. By combining the speed and density computation results, the flow can be inferred to reflect the movement of the moving objects. For example, in highway traffic, if the speed is fast and the density is low, the flow should be quite smooth. On the other hand, if the speed is slow and the density is high, the flow should be congested. Processing then terminates.

In the process of FIG. 6, motion information including speed, density and flow information are detected based on filtered motion vectors. However, it will be apparent that other motion information may be determined in an analogous manner.

Figure 8:
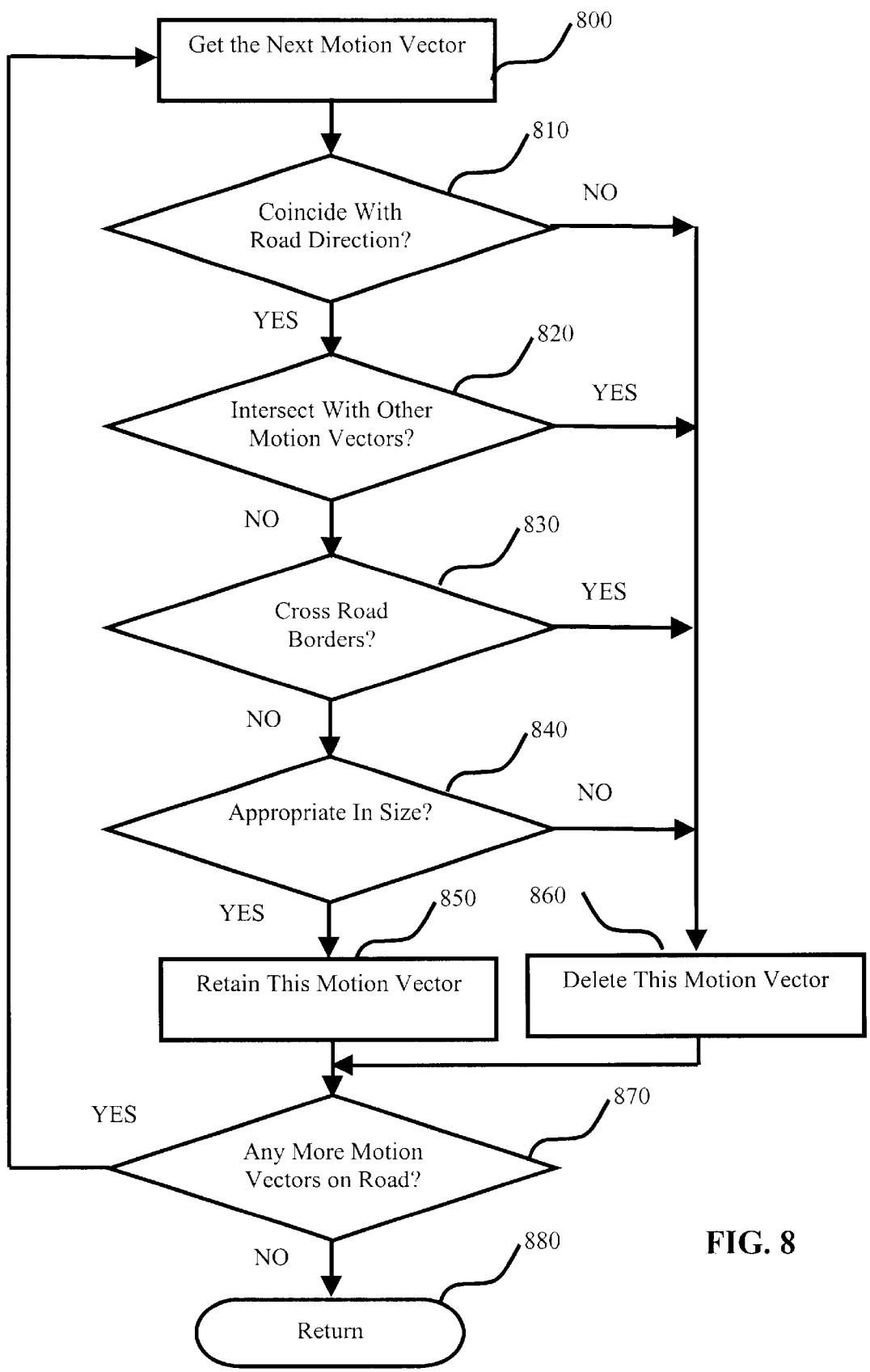
FIG. 8 is a detailed flow diagram illustrating the method of motion vector filtering based on traffic knowledge of FIG. 6.

FIG. 8 is a flow diagram depicting in detail step 620 of FIG. 6 involving motion vector filtering based on some specific environmental knowledge (preferably, traffic knowledge). In step 800, the next motion vector remaining to be processed is obtained. In decision block 810, a check is made to determine if the motion vector coincides with a predetermined direction, preferably the road direction. The direction a of a motion vector can be defined as follows:

$$\alpha = \arctan \frac{y_2 - y_1}{x_2 - x_1}$$

where $(x_1, y_1)$ and $(x_2, y_2)$ are the coordinates of the starting and ending points of the motion vector, respectively. Therefore, suppose the road direction is $\alpha_R$. If $\alpha_R - C < \alpha < \alpha_R + C$ (C is a constant), then a is regarded as coinciding with the road direction and this motion vector is to retained. That is, decision block 810 returns true (YES) and processing continues at decision block 820. Otherwise, if decision block 810 returns false (NO), processing continues at step 860, and the motion vector is regarded as an incorrect one and is eliminated. That is, the motion vector is deleted in step 860.

In decision block 820, a check is made to determine if a motion vector intersects with any others. That is, each motion vector is compared with other motion vectors (mainly the neighboring motion vectors of the current motion vector) to see if they have points of intersection. If decision block 820 returns true (YES), processing continues at step 860 and the current motion vector and the one intersecting with it are eliminated. The intersection of motion vectors indicates collision of moving objects or vehicles. Otherwise, if decision block 820 returns false (NO), processing continues at decision block 830.

In decision block 830, a check is made to determine if the current motion vector cross any road borders. That is, the motion vector is compared with the road borders to see if they have points of intersection. If decision block 830 returns true (YES), processing continues at step 860 and this motion vector is deleted, since a vehicle usually cannot go outside the road area. Otherwise, if decision block 830 returns false (NO), processing continues at decision block 840.

In decision block 840, a check is made to determine if the motion vector is of appropriate size or amplitude. That is, the mean amplitude value of the motion vectors on the road is calculated. The mean amplitude value M can be calculated as follows:

$$M = \frac{1}{N}\sum_{i=1}^{N} \sqrt{(x_{i2} - x_{i1})^2 + (y_{i2} - y_{i1})^2}$$

where N is the number of motion vectors on the road, and $(x_{i1}, y_{i1})$ and $(x_{i2}, y_{i2})$ are the coordinates of the starting and ending points of the ith motion vector, respectively. For a particular motion vector, if its amplitude is m and $$|m - M| < T$$

where T is a predetermined threshold, the motion vector is deemed as appropriate. If decision block 840 returns false (NO), processing continues at step 860 where the motion vector is eliminated. Otherwise, if decision block 840 returns true (YES), processing continues at step 850. In step 850, the current motion vector is retained. From each of steps 850 and 860, processing continues at decision block 870. In decision block 870, a check is made to determine if there are any more motion vectors on the road to be processed. If decision block 870 returns true (YES), processing continues at step 800 and the next motion vector is obtained for processing. Otherwise, if decision block 870 returns false (NO), processing continues at step 880. In step 880, processing returns to the method of FIG. 6. The processing of FIGS. 6 and 8 are described hereinafter with respect to FIGS. 2–5.

Figure 2A:
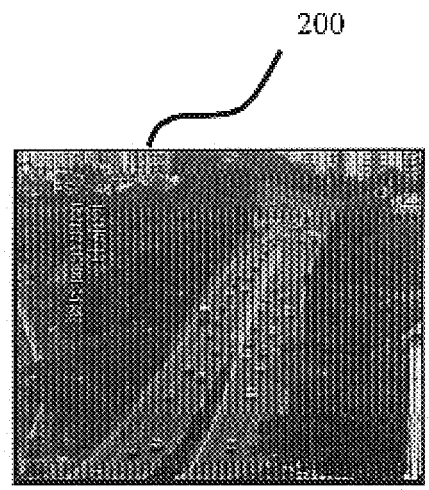
FIGS. 2A and 2B are still images of well-defined environments for motion information extraction, including a road or highway traffic scenario and a pedestrian traffic scenario.
Figure 2B:
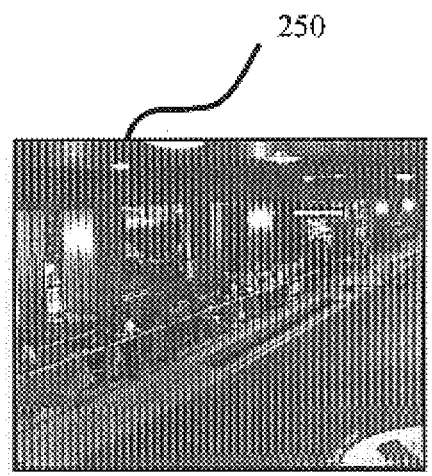

FIGS. 2A and 2B are still images 200 and 250 obtained from a video stream as examples of the well-defined environment for motion information extraction to be used with the embodiments of the invention. FIG. 2A depicts a still image 200 of highway traffic. In this still image 200, the camera setting is fixed, and the vehicles can only move through some fixed area (road) and in a predetermined direction (upstream or downstream). FIG. 2B depicts a still image 250 of an environment in which people are queuing. In this still image 250, the camera setting is also fixed, and the people are required to move between the two bars shown in the image 250 in the queue direction. Such images can be input to the process of FIG. 6 as part of the video stream or sequence 600.

Figure 3A:
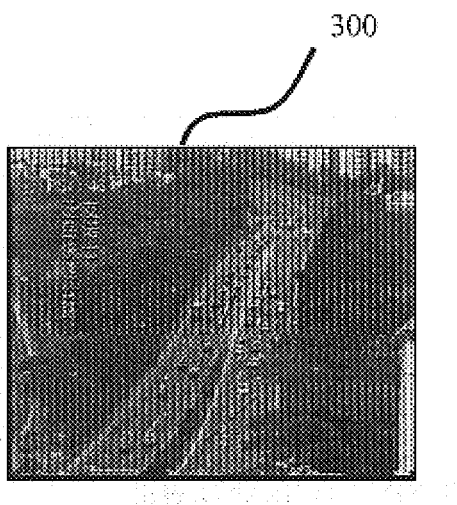
FIGS. 3A and 3B depict raw motion vectors, with and without the still image of FIG. 2A depicted.
Figure 3B:
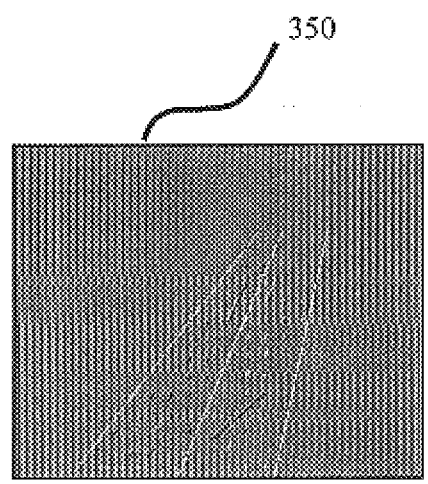

FIGS. 3A and 3B depict examples 300 and 350 of raw motion vectors of highway traffic extracted from a decoded MPEG video stream (according to step 610 of FIG. 6). FIG. 3A illustrates motion vectors superimposed or overlapping with their corresponding frame 300. FIG. 3B shows the motion vectors themselves 350, without the still image in the background. In FIG. 3B, there are three long, substantially vertical white lines depicting the road borders of the divided highway shown in FIG. 3A. In FIGS. 3A and 3B, the motion vectors of upstream road direction (left) are highlighted by black lines, and the motion vectors of downstream road direction (right) are highlighted by white lines. From the example, a number of incorrect motion vectors can be seen in both the upstream and downstream directions.

FIGS. 4A and 4B are still images 400 and 450 of the filtered motion vectors of highway traffic. FIG. 4A illustrates filtered motion vectors superimposed on or overlapping with their corresponding frame. FIG. 4B shows the filtered motion vectors themselves produced by step 620 and the process of FIG. 8. Similar to FIGS. 3A and 3B, the motion vectors of upstream road direction (left) are highlighted by black lines, and the motion vectors of downstream road direction (right) are highlighted by white lines. Following the processing of step 62, the incorrect motion vectors in both the upstream and downstream directions of FIGS. 3A and 3B are eliminated in FIGS. 4A and 4B.

FIG. 5 illustrates a projective transform between image coordinates 500 and world coordinates 550. This applies to all flat-surface moving situations. Because of the perspective view of the camera as well as the non-perpendicularity between the camera axis and the road surface, the motion vectors are not homogeneous in the image coordinate. For example, the motion vectors at the near end of the camera appear bigger than those at the far end of the camera. To solve this problem, a projective transform can be employed to convert the motion vectors from image coordinates to the world coordinates. Since the road surfaces are flat, vehicle motion is assumed to be parallel to the road plane. Using an off-line step, four or more lines or points can be specified corresponding between the image road plane and the world road plane. If the image coordinates are (x,y) and the world coordinates are (X, Y), a transform matrix H is determined by the rotation angles of the camera setting and is used to compute the transform:

$$\begin{bmatrix} X \\ Y \\ 1 \end{bmatrix} \propto H \begin{bmatrix} x \\ y \\ 1 \end{bmatrix}$$

By this transform, the motion vectors are made homogeneous in the world coordinate.

In particular, the matrix can be obtained in the following manner. Firstly, the matrix H1 is determined to transform the acquired image. The image is usually taken at an arbitrary angle from the road. The acquired image is transformed to that of an image taken by a camera having an axis perpendicular to the road surface. If the angle between the x-coordinate axis of the acquired image and the transformed image is a and the angle between the y-coordinate axis of the acquired image and the transformed image is β, the transform matrix H1 can be defined as follows:

$$H1 = \begin{pmatrix} \cos\beta & 0 & -\sin\beta \\ 0 & 1 & 0 \\ \sin\beta & 0 & \cos\beta \end{pmatrix} \cdot \begin{pmatrix} 1 & 0 & 0 \\ 0 & \cos\alpha & \sin\alpha \\ 0 & -\sin\alpha & \cos\alpha \end{pmatrix}$$

If the camera view does not cover the road surface after the transform, the camera origin may be translated to the place directly above the road surface. For simplicity but not lose general application, the camera is assumed to be placed appropriately above the road surface so that the camera view covers the road surface after the transform.

Therefore, this translation is not included in this step.

Secondly, a transform function is determined between the world coordinates and the transformed image coordinates obtained using H1. If the camera focus is f and the perpendicular distance between the camera and the road surface is Z, the transform function H2 is given as follows:

$$H2 = \frac{Z}{f}$$

Finally, the matrix H is determined as merely the concatenation of the two transforms H1 and H2:

$$H = H1 \cdot H2$$

Figure 9:
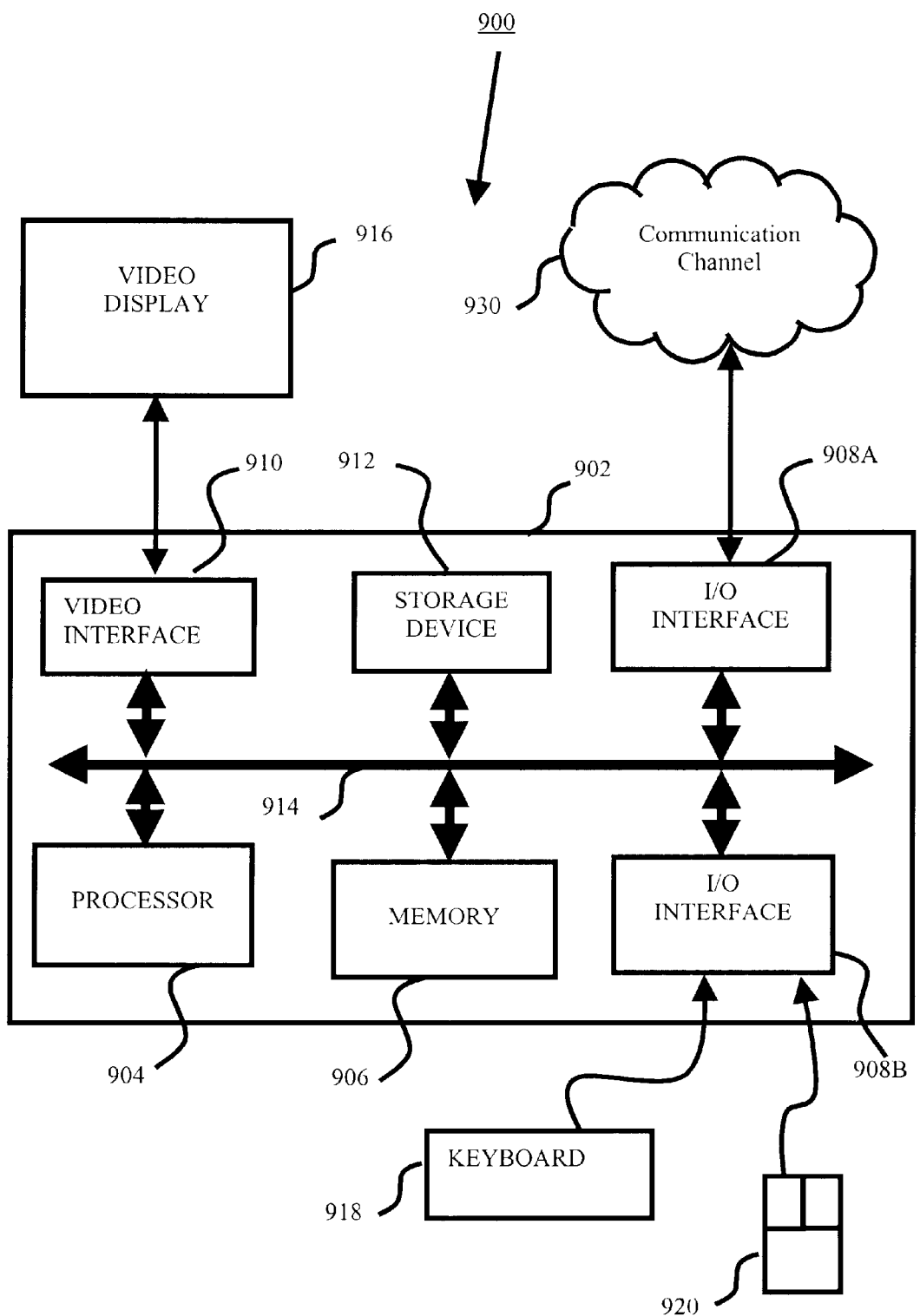
FIG. 9 is a block diagram of a general purpose computer with which embodiments of the invention can be practiced.

The embodiments of the invention are preferably implemented using a computer, such as the general-purpose computer shown in FIG. 9. In particular, the processes of FIGS. 6 and 8 can be implemented as software, or a computer program, executing on the computer. The method or process steps for extracting motion information from a video sequence containing interframe motion vectors are effected by instructions in the software that are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects an advantageous apparatus for extracting motion information from a video sequence containing interframe motion vectors in accordance with the embodiments of the invention.

The computer system 900 consists of the computer 902, a video display 916, and input devices 918, 920. In addition, the computer system 900 can have any of a number of other output devices including line printers, laser printers, plotters, and other reproduction devices connected to the computer 902. The computer system 900 can be connected to one or more other computers via a communication interface 908b using an appropriate communication channel 930 such as a modem communications path, a computer network, or the like. The computer network may include a local area network (LAN), a wide area network (WAN), an Intranet, and/or the Internet.

The computer 902 itself consists of a central processing unit(s) (simply referred to as a processor hereinafter) 904, a memory 906 which may include random access memory (RAM) and read-only memory (ROM), input/output (10) interfaces 908A and 908B, a video interface 910, and one or more storage devices generally represented by a block 912 in FIG. 9. The storage device(s) 912 can consist of one or more of the following: a floppy disc, a hard disc drive, a magneto-optical disc drive, CD-ROM, magnetic tape or any other of a number of non-volatile storage devices well known to those skilled in the art. Each of the components 904 to 912 is typically connected to one or more of the other devices via a bus 914 that in turn can consist of data, address, and control buses.

The video interface 910 is connected to the video display 916 and provides video signals from the computer 902 for display on the video display 916. User input to operate the computer 902 can be provided by one or more input devices 908B. For example, an operator can use the keyboard 918 and/or a pointing device such as the mouse 920 to provide input to the computer 902.

The system 900 is simply provided for illustrative purposes and other configurations can be employed without departing from the scope and spirit of the invention. Computers with which the embodiment can be practiced include IBM-PC/ATs or compatibles, one of the Macintosh (TM) family of PCs, Sun Sparcstation (TM), a workstation or the like. The foregoing are merely exemplary of the types of computers with which the embodiments of the invention may be practiced. Typically, the processes of the embodiments, described hereinafter, are resident as software or a program recorded on a hard disk drive (generally depicted as block 912 in FIG. 9) as the computer readable medium, and read and controlled using the processor 904. Intermediate storage of the program and video data and any data fetched from the network may be accomplished using the semiconductor memory 906, possibly in concert with the hard disk drive 912. While not shown in FIG. 9, a video or "sky" camera can be coupled to the computer 900 to provide video data. Video capture cards, video I/O boards, and the like are well-known to those skilled in the art.

In some instances, the program may be supplied to the user encoded on a CD-ROM or a floppy disk (both generally depicted by block 912), or alternatively could be read by the user from the network via a modem device connected to the computer, for example. Still further, the software can also be loaded into the computer system 900 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on web-sites and the like. The foregoing are merely exemplary of relevant computer readable mediums. Other computer readable mediums may be practiced without departing from the scope and spirit of the invention.

Thus, the embodiments of the invention perform motion information extraction using compressed video containing interframe motion vectors. The motion information is extracted under fixed camera settings and in a well-defined environment. The system includes a motion-vector extraction module, a motion vector-filtering module, and a motion information determining module. The motion-vector extraction module separates motion vectors from MPEG or H.26x streams when decoding. The motion vector filtering module eliminates incorrect and noisy motion vectors based on the well-defined environmental knowledge. The motion information determining module may include one or more of the following: a speed calculation module, a density estimation module and a flow detection module. The speed-calculation module computes speed based on motion vector statistics. The density-estimation module estimates density based on motion vector occupancy. The flow-detection module detects motion flow based on the speed and density combination.

The embodiments of the invention extract motion information using MPEG or H.26x motion vectors to provide faster and more cost-effective techniques. In particular, the embodiments start at a higher level in the hierarchy of motion information processing producing savings in computational cost. Further, the embodiments employ motion vector filtering under fixed camera settings and in a well defined environment knowledge to eliminate noises, and apply motion vector statistical analysis to obtain motion information.

The embodiments of the invention are advantageous in that faster and real-time processing can be implemented due to the hardware implementation of encoding card for motion vector calculation. Further, the embodiments utilise a digital infrastructure. MPEG and H.26x are standard digital formats for video transmission and storage. Still further, the embodiments provide broad viewing coverage, since MPEG and H.26x can support low resolution images. Yet another advantage is that the embodiments are cost effect since video encoding cards are relatively inexpensive and widely used by consumers.

In the foregoing manner, a method, an apparatus, and a computer program product for extracting motion information from a video sequence containing interframe motion vectors have been described. More particularly, a method, an apparatus, and a computer program product for monitoring traffic by extracting motion information from an encoded traffic video stream containing interframe motion vectors have been described. While only a small number of embodiments are described, it will be apparent to those skilled in the art in view of this disclosure that numerous changes and/or modifications can be made without departing from the scope and spirit of the invention.

What is claimed is:

1. A method of extracting motion information of an object in a video sequence from an encoded video stream containing interframe motion vectors under fixed camera settings and a well defined environment, said method including the steps of:

separating motion vectors obtained from said encoded video stream;

filtering said motion vectors based on predetermined environmental knowledge; and determining predetermined parameters of the object based on said filtered motion vectors, wherein said predetermined parameters of the object are mapped to world coordinates from image coordinates by a projective transform.

2. The method according to claim 1, wherein said filtering step includes the sub-step of eliminating any motion vectors that: do not coincide with a road direction, intersect with other motion vectors, cross a road border, or do not have appropriate amplitude or size.

3. The method according to claim 1, wherein said predetermined parameters include speed, density and flow.

4. The method according to claim 1, wherein said predetermined parameters are provided at regular time intervals.

5. The method according to claim 1, wherein said encoded video stream is obtained from a sky camera.

6. The method according to claim 1, wherein said determining step includes the step of calculating said motion information using motion vector analysis on said filtered motion vectors.

7. The method according to claim 1, wherein said video stream is a motion vector presentation of compressed video.

8. The method according to claim 7, wherein said compressed video has a format selected from the group of formats consisting of MPEG and H.26x.

9. The method according to claim 1, further including the step of detecting speed based on an amplitude calculation of said filtered motion vectors.

10. The method according to claim 1, further including the step of detecting density based on occupancy computation of microblocks with nonzero motion vectors.

11. The method according to claim 1, further including the step of estimating flow based on a combination of speed and density detection, said speed detected based on an amplitude calculation of said filtered motion vectors and said density detected by an occupancy computation of microblocks with nonzero motion vectors.

12. The method according to claim 1, wherein said interframe motion vectors are generated using electronic encoding hardware.

13. The method according to claim 1, wherein said filtering step includes at least one of the sub-steps of:

eliminating any motion vectors that do not coincide with a predetermined direction;

eliminating any motion vectors that intersect with other motion vectors;

eliminating any motion vectors that cross a predetermined border; and eliminating any motion vectors that do not have an appropriate amplitude or size.

14. An apparatus for extracting motion information of an object in a video sequence from an encoded video stream containing interframe motion vectors under fixed camera settings and a well defined environment, said apparatus including:

means for separating motion vectors obtained from said encoded video stream;

means for filtering said motion based on predetermined environmental knowledge; and means for determining predetermined parameters of the object based on said filtered motion vectors, wherein said predetermined parameters of the object are mapped to world coordinates from image coordinates by a projective transform.

15. The apparatus according to claim 14, wherein said filtering means includes means for eliminating any motion vectors that: do not coincide with a road direction, intersect with other motion vectors, cross a road border, or do not have appropriate amplitude or size.

16. The apparatus according to claim 14, wherein said predetermined parameters include speed, density and flow.

17. The apparatus according to claim 14, wherein said predetermined parameters are provided at regular time intervals.

18. The apparatus according to claim 14, wherein said encoded video stream is obtained from a sky camera.

19. The apparatus according to claim 14, wherein said determining means includes means for calculating said motion information using motion vector analysis on said filtered motion vectors.

20. The apparatus according to claim 14, wherein said video stream is a motion vector presentation of compressed video.

21. The apparatus according to claim 20, wherein said compressed video has a format selected from the group of formats consisting of MPEG and H.26x.

22. The apparatus according to claim 14, further including means for detecting speed based on an amplitude calculation of said filtered motion vectors.

23. The apparatus according to claim 14, further including means for detecting density based on occupancy computation of microblocks with nonzero motion vectors.

24. The apparatus according to claim 14, further including means for estimating flow based on a combination of speed and density detection, said speed detected based on an amplitude calculation of said filtered motion vectors and said density detected by an occupancy computation of microblocks with nonzero motion vectors.

25. The apparatus according to claim 14, wherein said interframe motion vectors are generated using electronic encoding hardware.

26. The apparatus according to claim 14, wherein said filtering means includes at least one of:

means for eliminating any motion vectors that do not coincide with a predetermined direction;

means for eliminating any motion vectors that intersect with other motion vectors;

means for eliminating any motion vectors that cross a predetermined border; and means for eliminating any motion vectors that do not have an appropriate amplitude or size.

27. A computer program product having a computer readable medium having a computer program recorded therein for extracting motion information of an object in a video sequence from an encoded video stream containing interframe motion vectors under fixed camera settings and a well defined environment, said computer program product including:

means for separating motion vectors obtained from said encoded video stream;

means for filtering said motion vectors based on predetermined environmental knowledge; and means for determining predetermined parameters of the object based on said filtered motion vectors, wherein said predetermined parameters of the object are mapped to world coordinates from image coordinates by a projective transform.

28. The computer program product according to claim 27, wherein said filtering means includes means for eliminating any motion vectors that: do not coincide with a road direction, intersect with other motion vectors, cross a road border, or do not have appropriate amplitude or size.

29. The computer program product according to claim 27, wherein said predetermined parameters include speed, density and flow.

30. The computer program product according to claim 27, wherein said predetermnined parameters are provided at regular time intervals.

31. The computer program product according to claim 27, wherein said encoded video stream is obtained from a sky camera.

32. The computer program product according to claim 27, wherein said determining means includes means for calculating said motion information using motion vector analysis on said filtered motion vectors.

33. The computer program product according to claim 27, wherein said video stream is a motion vector presentation of compressed video.

34. The computer program product according to claim 33, wherein said compressed video has a format selected from the group of formats consisting of MPEG and H.26x.

35. The computer program product according to claim 27, further including means for detecting speed based on an amplitude calculation of said filtered motion vectors.

36. The computer program product according to claim 27, further including means for detecting density based on occupancy computation of microblocks with nonzero motion vectors.

37. The computer program product according to claim 27, further including means for estimating flow based on a combination of speed and density detection, said speed detected based on an amplitude calculation of said filtered motion vectors and said density detected by an occupancy computation of microblocks with nonzero motion vectors.

38. The computer program product according to claim 27, wherein said interframe motion vectors are generated using electronic encoding hardware.

39. The computer program product according to claim 27, wherein said filtering means includes at least one of:

means for eliminating any motion vectors that do not coincide with a predetermined direction;

means for eliminating any motion vectors that intersect with other motion vectors;

means for eliminating any motion vectors that cross a predetermined border; and means for eliminating any motion vectors that do not have an appropriate amplitude or size.

\* \* \* \* \*